T. H. WALBRIDGE.
SPOKE.
APPLICATION FILED OCT. 29, 1906.
922,737.
Patented May 25, 1909.
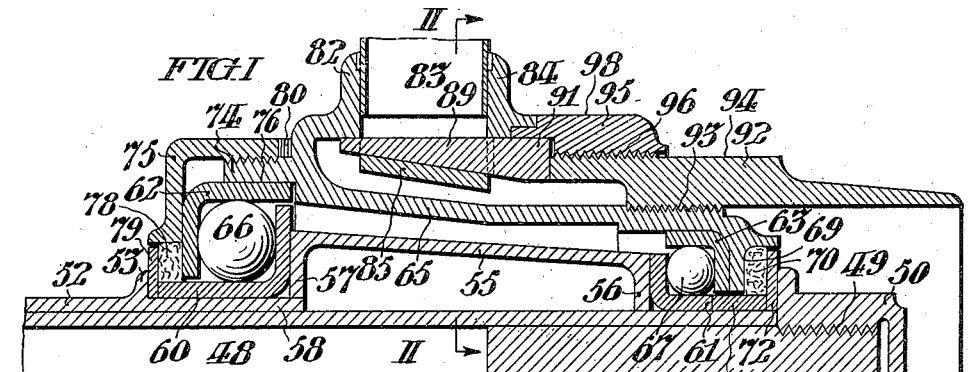
FIG. I.
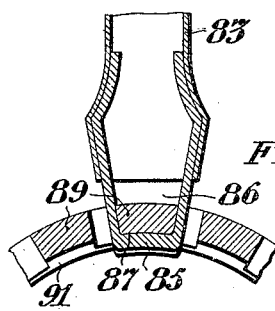
FIG. II.
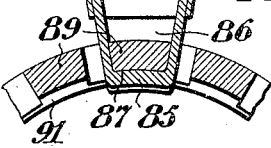
FIG. VI.
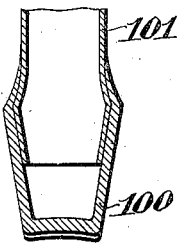
FIG. III.
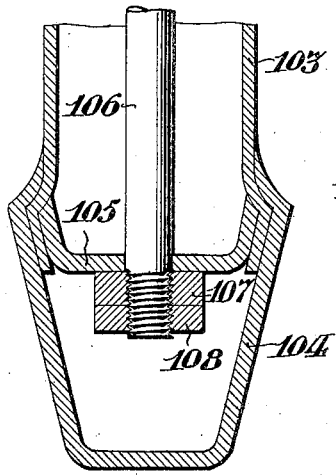
FIG. IV.
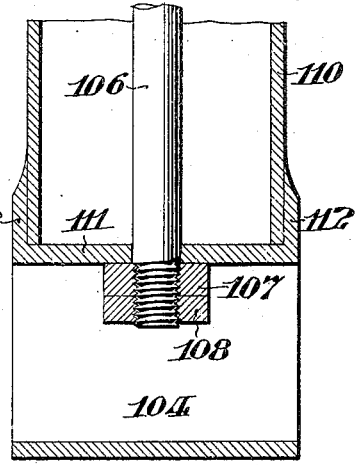
FIG. V.
WITNESSES:
Clifton C. Hallowell
Thomas W. Kerr.
INVENTOR:
THOMAS H. WALBRIDGE,
By Arthur E. Paige
Atty.

UNITED STATES PATENT OFFICE.

THOMAS H. WALBRIDGE, OF TOLEDO, OHIO.

SPOKE.

No. 922,737. Specification of Letters Patent. Patented May 25, 1909.

Application filed October 29, 1906. Serial No. 340,973.

*To all whom it may concern:*

Be it known that I, THOMAS H. WALBRIDGE, of Toledo, Ohio, have invented a certain new and useful Improvement in Spokes, whereof the following is a specification, reference being had to the accompanying drawings.

My improvement is particularly adapted for embodiment in vehicle wheels wherein the spokes are tensely strained between a hub and felly, and it is an object of my invention to provide a spoke with distinct means at its inner end whereby it may be engaged and drawn inwardly with respect to a hub by adjustable wedging means in the hub. In the forms of my invention hereinafter described, such engaging means comprise ledges extending transversely with respect to the axis of the spokes, and, the term hasp used herein is intended to be comprehensive of any such engaging means.

My invention includes a tubular spoke having a hasp at its inner end and means connecting said hasp with the spoke comprising a rod extending through the spoke in engagement with the hasp and provided at its outer end with means to engage a felly; and, a tubular spoke provided with a bushing at its outer end having a socket extending therethrough in concentric relation with the spoke, the inner edge of said socket opening being oblique with respect to the inner surface of the spoke, so as to prevent the lodgment of surplus solder in the spoke during the operation of connecting said bushing with the spoke body.

My invention comprises the various novel features of construction and arrangement hereinafter more definitely specified.

In said drawings; Figure I, is a fragmentary diametrical sectional view of the upper half of a wheel hub showing a convenient form of my invention. Fig. II, is a sectional view of the spoke shown in Fig. I, taken on the line II, II, in said figure. Figs. III and IV, are sectional views similar to Fig. II, but showing modified forms of spokes. Fig. V, is a sectional view of a spoke taken in a plane parallel with the wheel axis. Fig. VI, is a longitudinal sectional view of a modified form of spoke connected with a felly.

Referring to the form of my invention shown in Figs. I and II; the axle 48, has the screw thread 49, at its outer end for engagement with the nut 50, and is provided with the sleeve 52, having the abutment flange 53, which determines the position of the wheel.

The skein 55, has its outer end 56, fitted directly upon the axle 48, and its inner end 57, fitted upon the outer portion 58, of the sleeve 52; said sleeve being of circular cross section within the wheel hub but being rectangular throughout its portion extending inwardly from said flange 53, in order to form a seat for the spring connection between the axle and the vehicle. Said skein 55, maintains the ball bearing rings 60 and 61, separated a predetermined distance, but is movable axially with said rings to permit adjustment of the ball bearings comprising said rings 60 and 61, the rings 62 and 63, opposed thereto in the axle box 65, and the two series of balls 66 and 67 which are mounted between them. The outer end of said axle box 65, is provided with the recess 69, for the dust ring 70 which may be conveniently formed of felt or similar material encircling the loose collar 71, which abuts against the ball ring 61 on the axle 48. Said dust ring 70, is retained in position by the washer 72, supported by the nut 50. The inner end of said box 65, is provided with the screw threaded flange 74, engaged by the ball bearing adjusting cap 75, whereby the ball ring 62 may be shifted axially in its recess 76, in said box 65. The joint between said rings 60 and 62, is covered by the dust ring 78 which is retained in position by the washer 79, supported by the flange 53. The space between the inner edge of said ring 75 and the box 65, may be filled with washers 80 as indicated in Fig. I. Said box 65 comprises the flange 82, in rigid relation therewith, engaging the inner ends of the spokes 83, the opposite sides of said spokes being engaged by the loose clamp ring 84. The inner ends of said spokes 83, are respectively provided with the hasps 85, which as shown in Fig. II, are bights of sheet metal secured in rigid relation with the ends of the spokes, and comprise recesses 86 above the ledges 87, in which individual wedges 89 are fitted as indicated in Figs. I and II. As shown in Fig. II, said wedges 89, are carried by the thrust ring 91, being conveniently formed in unitary relation therewith. Said wedges 89 may be axially adjusted, to draw the spokes 83 radially inward with respect to the hub and tensely strain them, by rotation of the thrust sleeve 92, which has the screw thread 93, engaging the box 65, and a wrench hold upon its surface 94, exterior to the hub. When said spokes 83, have been properly adjusted by rotation of the thrust sleeve 92, they may be clamped between the stationary flange 82, and the loose clamp ring 84, by rotation of the clamping nut 95, which has the screw thread 96, engaging said thrust sleeve 92, and is provided with a wrench hold upon its surface 98, exterior to the hub.

In the form of spoke shown in Fig. II, the hasp 85, is conveniently formed of a strip of metal fitted within the tubular body portion of the spoke 83, to which it may be welded or brazed. In the form of my invention shown in Fig. III, the hasp 100 which otherwise resembles the hasp 85, is conveniently secured upon the exterior of the tubular spoke body 101.

As indicated in Fig. IV, the tubular spoke 103, provided with a hasp 104, secured upon its exterior in the manner contemplated with respect to Fig. III, is reinforced by the internal brace plate 105, and by the rod 106, extending therethrough and secured by the lock nuts 107 and 108.

As indicated in Fig. V, the spoke 110, otherwise similar to the spoke 103, shown in Fig. IV, has the brace plate 111, provided with flanges 112, extending outside of the spoke body.

In the forms of my invention shown in Figs. IV and V, the spokes 103, and 110 being strained inwardly by wedging means connecting with the hasps 104; the rods 106 only receive such tensile strain as is transmitted to them through the brace plates 105, or 111. Therefore, in order to oppose the maximum tensile strength of the internal rods to the strain upon the spokes, I prefer to extend them through the bights of the hasps so as to support the latter as shown in Fig. VI, wherein the tubular spoke body 115, is provided with the hasp 116, secured upon its exterior like the hasp 100 shown in Fig. III, but, the internal rod 117, extends through said hasp 116, and is secured to the latter by the nut 118, engaging the screw thread 119, on the rod. In this form of my invention the hasp 116, is preferably engaged and inwardly strained by a wedge 120, which is bifurcated so as to extend upon opposite sides of the rod 117.

As shown in Fig. VI, the outer end of the spoke 115, is provided with the bushing 122, through which the rod 117, extends; the screw thread 123, on the rod engages the socket 124 in said bushing, and the head 125 on said rod, overlaps the felly member 126 and rigidly connects the felly 127 with said spoke.

It may be observed that the inner edge 128 of the socket opening 129, in said bushing 122, extends obliquely with respect to the inner surface of the spoke body 115, so as to facilitate the discharge of the molten solder which otherwise would lodge in the spoke during the operation of connecting the spoke with said bushing.

I do not desire to limit myself to the precise details of construction and arrangement herein described, as it is obvious that various modifications may be made therein without departing from the scope of the following claims.

I claim:—

1. A spoke, the body of which is a hollow shell of sheet metal, provided at its inner end with a hasp, and at its outer end with a bushing distinct from said shell, said bushing having a socket extending therethrough in concentric relation with the spoke, and the inner edge of said opening being oblique with respect to the inner surface of the spoke body, substantially as set forth.

2. A spoke, the body of which is a hollow shell of sheet metal, provided at its outer end with a bushing distinct from said shell; said bushing having a socket extending therethrough in concentric relation with the spoke, and the inner edge of said socket opening being oblique with respect to the inner surface of the spoke body, substantially as set forth.

3. A spoke, the body of which is a hollow shell of sheet metal, provided at its outer end with a bushing distinct from said shell; said bushing having a socket extending therethrough in concentric relation with the spoke, and the inner edge of said socket opening being oblique with respect to the inner surface of the spoke body; said bushing having a screw thread for connection with the felly, substantially as set forth.

4. A tubular spoke having its body formed of sheet metal and having an inseparable hasp at its inner end, comprising a bight forming a ledge extending transversely with respect to the axis of the spoke, and projecting beyond the perimeter of the spoke, substantially as set forth.

5. A spoke, the body of which is a hollow shell of sheet metal having a hasp at its inner end arranged to engage a retaining wedge, said hasp being formed of a member distinct from said shell; and, means connecting said hasp with said shell, comprising a rod extending through the spoke in engagement with said hasp, substantially as set forth.

6. A spoke, the body of which is a hollow shell of sheet metal having a hasp at its inner end arranged to engage a retaining wedge, said hasp being formed of a member distinct from said shell; and, means connecting said hasp with said shell, comprising a rod extending through the spoke in engagement with said hasp; said rod being provided with means at its outer end to engage a felly, substantially as set forth.

7. A tubular spoke, having its body formed of sheet metal and having a bushing soldered in one end thereof; said bushing comprising a socket opening therethrough, the inner edge of said opening being beveled at an obtuse angle with respect to the contiguous inner surface of the spoke body, substantially as set forth.

In testimony whereof, I have hereunto signed my name at Toledo, Ohio, this seventeenth day of October 1906.

THOMAS H. WALBRIDGE.

Witnesses:
A. C. VAN DRIESEN,
A. VAN WORMER.